(12) United States Patent   (10) Patent No.: US 12,571,556 B2

Mostafavi et al.   (45) Date of Patent: Mar. 10, 2026

(54) ADAPTIVE MODEL PREDICTIVE CONTROL OF BUILDING HVAC USING MOVING HORIZON ESTIMATION

(71) Applicant: Genesee Valley Innovations, LLC, Santa Clara, CA (US)

(72) Inventors: Saman Mostafavi, San Francisco, CA (US); Harish Doddi, Palo Alto, CA (US); Yu-Wen Lin, Palo Alto, CA (US); David Schwartz, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 743 days.

(21) Appl. No.: 17/865,961

(22) Filed: Jul. 15, 2022

(65) Prior Publication Data

US 2024/0019156 A1  Jan. 18, 2024

(51) Int. Cl.
| | |
|---|---|
| *F24F 11/64* | (2018.01) |
| *F24F 11/46* | (2018.01) |
| *G05B 13/04* | (2006.01) |

(52) U.S. Cl.
CPC .............. *F24F 11/64* (2018.01); *F24F 11/46* (2018.01); *G05B 13/048* (2013.01)

(58) Field of Classification Search
CPC .... G05B 13/027; G05B 13/048; G05B 15/02; F24F 11/46; F24F 11/62; F24F 11/64
See application file for complete search history.

(56) References Cited

U.S. PATENT DOCUMENTS

| | | |
|---|---|---|
| 4,118,299 A | 10/1978 | Maget |
| 6,159,352 A | 12/2000 | Riera et al. |

(Continued)

FOREIGN PATENT DOCUMENTS

| | | |
|---|---|---|
| EP | 3336064 | 6/2018 |
| WO | 20150143332 | 9/2015 |
| WO | 20180191806 | 10/2018 |

OTHER PUBLICATIONS

Andersson et al., "Casadi: a software framework for nonlinear optimization and optimal control," Mathematical Programming Computation, 2019; 11(1), 1-36.

Bacher and H. Madsen, "Identifying suitable models for the heat dynamics of buildings," Energy and Buildings, 2011;43 (7):1511-1522.

Kelman and F. Borrelli, "Bilinear model predictive control of a HVAC system using sequential quadratic programming," FAC Proceedings vols. 2011;44(1): 9869-9874.

(Continued)

*Primary Examiner* — M.N. Von Buhr

(74) *Attorney, Agent, or Firm* — Mueting Raasch Group

(57) ABSTRACT

A differentiable physics model of a building is used that defines thermodynamic relationships between zones of the building and a heating, ventilation, and air-conditioning (HVAC) system. A physics-constrained, data driven model learns behaviors of controlled components of the HVAC system. For each of a series of times during online operation of the HVAC system, past state values are recorded representing a performance of the HVAC system in the building and past inputs to the HVAC system to maintain the states. The past state values and the past inputs are input into the differentiable physics model and the data driven model to: jointly update first parameters of the differentiable physics model and second parameters of the data driven model, e.g., using moving horizon estimation; and determine a current input to the controlled components, e.g., using model predictive control.

18 Claims, 15 Drawing Sheets

(56) References Cited

U.S. PATENT DOCUMENTS

| | | | |
|---|---|---|---|
| 6,719,891 B2 | 4/2004 | Ruhr et al. | |
| 7,974,076 B2 | 7/2011 | Xiong et al. | |
| 8,121,818 B2 | 2/2012 | Gorinevsky | |
| 8,545,692 B2 | 10/2013 | James et al. | |
| 8,924,035 B2 | 12/2014 | Greene et al. | |
| 9,112,217 B2 | 8/2015 | Kim et al. | |
| 9,546,426 B2 | 1/2017 | Logan et al. | |
| 9,548,620 B2 | 1/2017 | Hu et al. | |
| 10,124,296 B2 | 11/2018 | Pozzo et al. | |
| 10,371,405 B2* | 8/2019 | Albonesi | F24F 11/30 |
| 10,374,239 B2 | 8/2019 | Zhang et al. | |
| 10,525,417 B2 | 1/2020 | Newbloom et al. | |
| 11,020,713 B2 | 6/2021 | Demeter et al. | |
| 11,149,970 B2 | 10/2021 | Bahar et al. | |
| 11,522,487 B2* | 12/2022 | Dong | H02S 10/20 |
| 11,953,865 B2* | 4/2024 | Risbeck | G05B 13/048 |
| 12,222,120 B2* | 2/2025 | Turney | F24F 11/64 |
| 2006/0141346 A1 | 6/2006 | Gordon et al. | |
| 2009/0216380 A1* | 8/2009 | Kolk | F24F 11/46 |
| | | | 700/277 |
| 2021/0018206 A1* | 1/2021 | Barooah | F24F 11/52 |
| 2021/0370228 A1 | 12/2021 | Benedict et al. | |
| 2022/0171353 A1* | 6/2022 | Ramsundar | G06F 30/27 |

OTHER PUBLICATIONS

Kuhl et al., "A real-time algorithm for moving horizon state and parameter estimation," Computers & Chemical Engineering, 2011; 35(1), 71-83.

Wachter and L. T. Biegler, "On the implementation of an interior-point filter line-search algorithm for large-scale nonlinear programming," Mathematical programming, 2006;106(1): 25-57.

Atam and L. Helsen, "Control-oriented thermal modeling of multizone buildings: methods and issues: intelligent control of a building system," IEEE Control systems magazine, 2016;36(3): 86-111.

Petrova et al., "Perfluorinated hybrid membranes modified by metal decorated clay nanotubes", Journal of Membrane Science, vol. 582, Jul. 15, 2019, pp. 172-181.

Pismenskaya et al., "Can the electrochemical performance of heterogeneous ion-exchange membranes be better than that of homogeneous membranes?", Journal of Membrane Science, vol. 566, Nov. 15, 2018, pp. 54-68.

Shah et al., "Comparative Studies on Performance of Interpolymer and Heterogeneous Ion-Exchange Membranes for Water Desalination by Electrodialysis", Desalination 172, 2005, pp. 257-265.

* cited by examiner

MODEL PARAMETERS AND CONSTANTS

| Name | Value | comments |
|---|---|---|
| $n$ | 5 | number of zones |
| $\delta t$ | 5 | sampling time [min] |
| $C_{pa}\,(T)$ | $981 + 0.08/T$ | air specific heat $[\,J\,/\,kg\,/\,K\,]$ |
| $M_h$ | 2 | max. water flow [kg/s] |
| $M_c$ | 10 | max. water flow [kg/s] |
| $k_p$ | 1e1 | proportional gain |
| $k_i$ | 4.4e-5 | Integral gain |
| $k_{p,i}$ | 1e1 | proportional gain |
| $k_{int,i}$ | 1e-6 | Integral gain |
| $\eta_h$ | 0.3 | heating coil efficiency |
| $\eta_c$ | 0.6 | cooling coil efficiency |
| $r_{mix}$ | 0.4 | mixing ratio |
| $C_i$ | 2 | capacitance $[\,kWh\,/\,{}^\circ C\,]$ |
| $R_{ij}$ | 1.72 | resistance $[{}^\circ C\,/\,kW\,]$ |
| $R_{i,\,n+1}$ | 4.54 | resistance $[{}^\circ C\,/\,kW\,]$ |
| $A_\omega^i$ | 8 | window area $[\,m^2\,]$ |

FIG. 9

ADAPTIVE MODEL PREDICTIVE CONTROL OF BUILDING HVAC USING MOVING HORIZON ESTIMATION

SUMMARY

The present disclosure is directed to identifying suitable models for adaptive control of building heating, ventilation, and air conditioning using moving horizon estimation. In one embodiment a differentiable physics model of a building is determined. The differentiable physics model defines thermodynamic relationships between zones of the building and a heating, ventilation, and air-conditioning (HVAC) system. A physics-constrained, data driven model is formed that learns behaviors of controlled components of the HVAC system. For each of a series of times during online operation of the HVAC system, past state values are recorded that represent a performance of the HVAC system in the building and past inputs to the HVAC system to maintain the states. The past state values and the past inputs are input into the differentiable physics model and the data driven model to: jointly update first parameters of the differentiable physics model and second parameters of the data driven model; and determine a current input to the controlled components. The current input is applied to the controlled components.

In another embodiment, a system includes a plurality of sensors that collect state information from zones of a heating, ventilation, and air-conditioning (HVAC) of a building. The system also includes a plurality of controlled components of the HVAC system coupled to receive inputs that affect the state information. A controller of the system has a data interface that receives the state information and sends the inputs to controlled components of the HVAC system. The controller includes a data storage unit that stores a differentiable physics model of the building that defines thermodynamic relationships between the zones of the building and the HVAC system. The differentiable physics model has first parameters that are updatable during operation of the HVAC system. The storage unit also stores a physics-constrained, data driven model that learns behaviors of the controlled components. The data driven model has second parameters that are updatable during operation of the HVAC system. The controller further includes a processor coupled to the data interface and the data storage unit. The processor is configured to perform: for each of a series of times during online operation of the HVAC system, recording past state values representing a performance of the HVAC system in the building and recording past inputs to the HVAC system to maintain the states; inputting the past state values and the past inputs into the differentiable physics model and the physics-constrained, data driven model to jointly update the first parameters and the second parameters and to determine a current input to the controlled components; and applying the current input to the controlled components.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The figures are not necessarily to scale.

FIG. 9 is a table showing model parameter and constraints that may be used in both simulated and actual control systems according to example embodiments.

DETAILED DESCRIPTION

The present disclosure is generally related to heating, ventilation, and air-conditioning (HVAC) systems. Embodiments include a method and system for scalable modeling and identification for HVAC control in a multi-zone structure such as a commercial building. The approach comprises: (a) a resistance-capacitance (RC) model based on first order energy balance for deriving the zone temperature dynamics, and (b) a neural network, identified by physics constrained learning, that captures the HVAC system's supply air temperature dynamics. Joint state and parameter estimation for this model is performed using a moving horizon estimation (MHE) algorithm.

The identified model can be leveraged in model predictive control (MPC) for HVAC energy savings and occupant comfort satisfaction and demonstrate the effectiveness of the proposed methodology in simulating good predictive accuracy for a horizon of several hours. These simulations show substantial cost savings compared to a "legacy" control scenario while maintaining occupant comfort. These embodiments need rely only on building management system data and does not require a detailed building model. This can significantly aid the adoption of MPC for future grid-interactive building.

INTRODUCTION

According to recent estimates residential and commercial buildings account for nearly 40% of energy usage in the United States. A significant amount of this energy consumption can be eliminated by improving the building HVAC control system, for example using predictive control methods. Among these methods, model predictive control (MPC) is a particularly powerful approach for handling hard constraints for state and control inputs in nonlinear multivariable control systems. In simulation studies as well as field studies without time or budget constraints on the modeling process, MPC is the standard for energy efficient building control, as long as a model of the plant exists or can be formulated and identified.

In reality, however, developing a control model for the uncertain building environment is the main obstacle for deployment of MPC, accounting for as much as 70% of the total effort of setting up an MPC controller. Challenges include heterogeneity of components, uncertainty in data and model, and the size and complexity of buildings. These challenges significantly limit the potential of a scalable formalism for detailed high-fidelity physics-based model generation. First order models, the common alternative, are much easier to formulate. However, they need constant calibration to accommodate inaccuracies associated with significant lumping of the true nonlinear dynamics. Recent studies approach the modeling challenges in various ways including modular model development, differentiable controls, and using Gaussian process for chance constrained MPC. None of these approaches is both data efficient and scalable beyond the test scenario.

Figure 1:
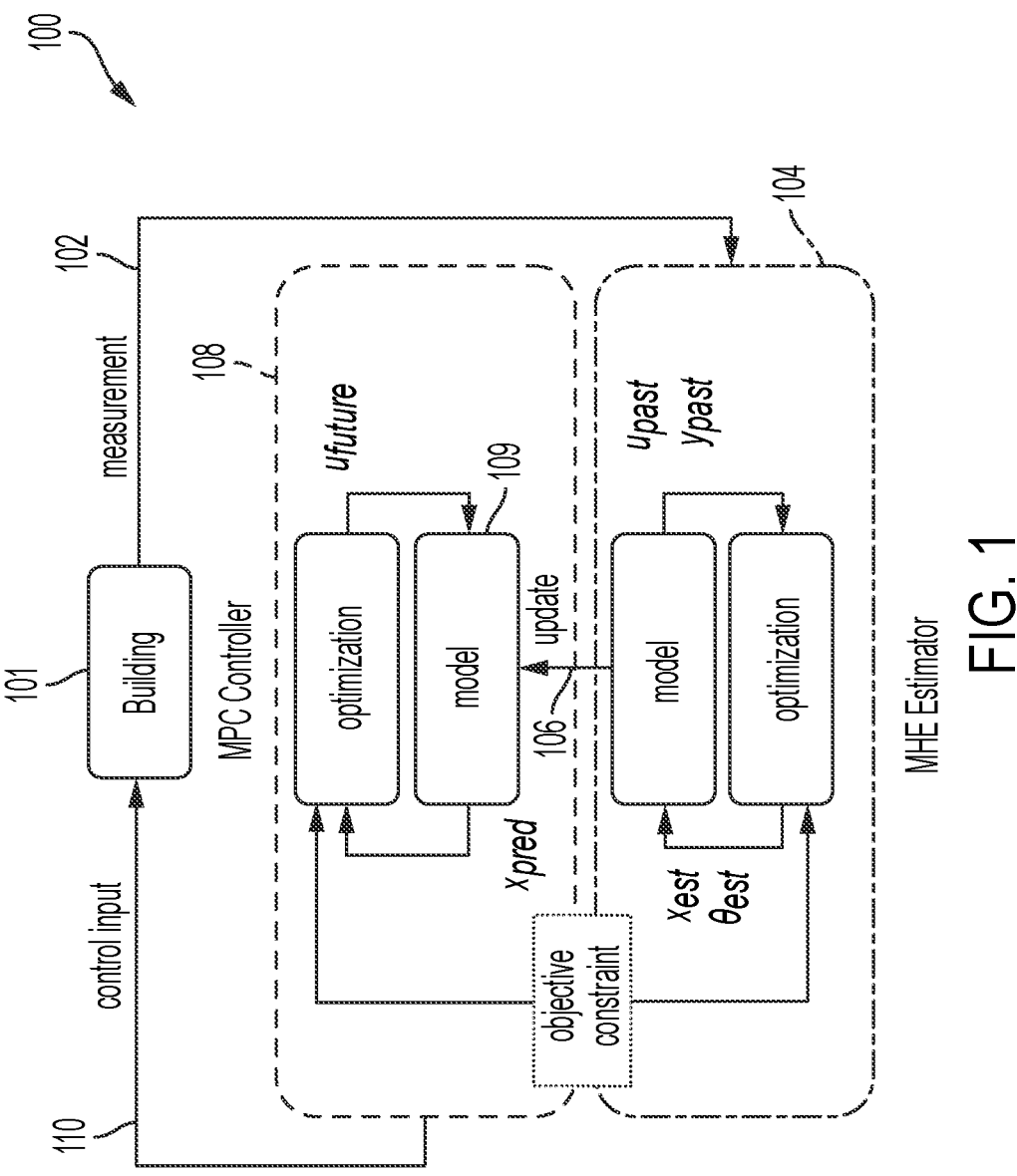
FIG. 1 is a block diagram illustrating a system according to an example embodiment.

The focus of this disclosure is the modeling and identification of a control-oriented building model comprising a gray-box, lumped-parameter zone model that is augmented with a neural network for unknown HVAC dynamics. For a description of gray-box, lumped-parameter zone models, see, e.g., P. Bacher and H. Madsen, "Identifying suitable models for the heat dynamics of buildings," Energy and Buildings, vol. 43, no. 7, pp. 1511-1522, 2011. In FIG. 1, a block diagram illustrates a system 100 according to an example embodiment. The system 100 obtains measurements 102 from a building 101 that are input to a moving horizon estimation (MHE) algorithm 104. The MHE algorithm 104 is used to update 106 the model 109 of an MPC controller 108, which provides control inputs 110 to the building's HVAC system.

In each time period, the system 100 performs parameter/state estimation and update the model 109 to be used in the MPC controller 108. The first computed optimal input from MPC controller 108 is then applied to the building HVAC system and the measurements are collected for the next iteration of estimation and control. To the best of our knowledge, this is the first work to consider a physics constrained, MHE based learning algorithm for data driven HVAC model, coupled with a physics based zone level model, for identification and control in building energy optimization. Section II below provides a detailed summary of the modeling methodology for zones and the HVAC system. Section III outlines the formulation of the online identification algorithm alongside model predictive control formulation. Section IV demonstrates the effectiveness of the proposed approach in handling a supervisory control problem for a case study based on U.S. Department of Energy reference model of a five zone building, followed by an analysis of the results and limitations. Section V provides a summary and conclusion.

II. System Model

Figure 2:
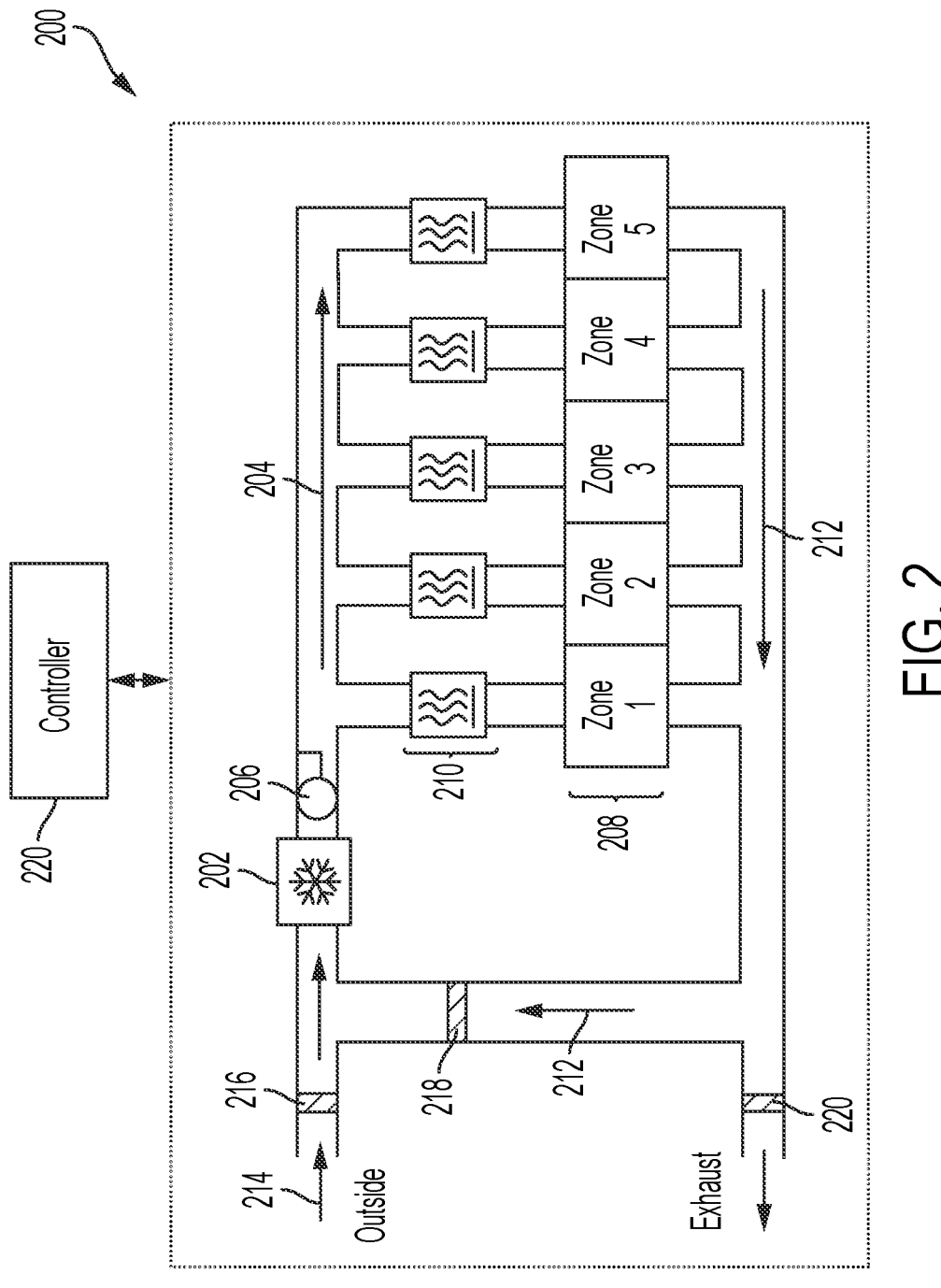
FIG. 2 is a block diagram of an example heating, ventilation, and air conditioning system which is used to demonstrate application of a method according to an example embodiment.

In FIG. 2, a block diagram depicts the schematic of the model building and HVAC system 200. Note that the configuration in FIG. 2 is presented as an illustrative example used in commercial buildings, however the proposed methodology can be adapted to a variety of different systems and architectures with minimal effort. Block 202 represents the central cooling system that regulates the temperature of central chilled supply air 204. A supply fan 206 controls the total airflow rate. The central chilled supply air 204 is divided equally between five separate zones 208 and is fed to each individual zone 208 via respective variable air volume (VAV) reheat boxes 210, each include a heating unit and dampers. The reheat boxes 210 control the supply temperature and flow rate to comply with the thermostat set points of each individual zone 208. The return air from each individual zone 208 is combined to form return air flow 212. The return air flow 212 is mixed with outside air 214 (via dampers 216, 218) to achieve ventilation requirements, and may involve exhausting air via damper 220.

The system 200 uses a first order RC model to track average zone-level temperatures and neglect humidity. Due to heterogeneity of HVAC equipment, one cannot effectively generalize a physics-based lower-order structure for modeling supply air temperature dynamics. Therefore, we treat the dynamics of HVAC as unknown and model them with a neural network whose identification is physics-constrained. The details of the modeling approach are provided below.

A. Modeling the Dynamics for Zone Temperatures

In this section, a differentiable physics model of a building is determined. The differentiable physics model defines thermodynamic relationships between zones of the building and an HVAC system. We consider a thermal zone i with temperature $T_{z,i}$ and thermal capacitance $C_i$. $T_{z,j}$ represents the temperature of a neighboring thermal zone j that is separated by a wall of thermal resistance $R_{ij}$. Applying Kirchhoff s law, in continuous time the total heat load on a thermal node i for n zone building can be expressed via the following differential equations:

$$C_i \frac{dT_{z,i}}{dt} = \sum_{j=1, j \neq i}^{n+1} a_{ij} \frac{T_{z,j} - T_{z,i}}{R_{ij}} + \dot{Q}_{tot,i} \tag{1a}$$

$$\dot{Q}_{tot,i} = \dot{Q}_{occ,i} + \dot{Q}_{sol,i} + \dot{Q}_{hvac,i} + \dot{Q}_{other,i} \tag{1b}$$

$$\dot{Q}_{hvac,i} = m_{z,i} c_{pa} (T_{supp,h,i} - T_{zi}), \tag{1c}$$

$$\dot{Q}_{sol,i} = A_w^i \eta_{sol} \tag{1d}$$

where $a_{ij}=1$ if there exist a wall between zone i and zone j, else $a_{ij}=0$. Note that for n zones, we have n+1 thermal nodes where the last one is the measured ambient temperature. Total thermal current comprises of $\dot{Q}_{occ,i}$ representing occupant thermal load, $\dot{Q}_{sol,i}$ solar irradiation, $\dot{Q}_{hvac,i}$ supply air entering the room and $\dot{Q}_{occ,i}$ other stochastic disturbances (equivalent to a process noise in state space form). $T_{supp,h,i}$ represents the supply air temperature entering the zone i with specific heat capacity $c_{pa}$, and $A_w^i$, $\eta_{sol}$ are window area for zone i and measured solar irradiance respectively. Note that we assume occupancy and weather forecast for the control horizon are available on demand through occupancy sensor data and online weather services. This is further helped by the fact that the control inputs are recomputed in a receding horizon based on the latest weather and occupancy data and that the MPC horizon is relatively not long (few hours). The zone model has the parameters $\theta_{RC}$, {$C_i$, $R_{ij}$, $A_w^i$} for i∈{1, 2, . . . , n} to be learned from data.

B. Modeling the Dynamics for Supply Air Temperature

It is typical for commercial HVAC systems to have a central unit supplying air to several distributed components. Without loss of generality, we can also assume that each of these components are controlled by fine-tuned proportional integral (PI) controllers as is common practice in commercial buildings. Given the heterogeneity of HVAC systems, we consider a physics-constrained, data driven model that estimates behavior of controlled components of the HVAC system. In the examples shown below, the data driven model is implemented as a neural network model that can be scaled to any type of HVAC system. The data driven model can be other linear or non-linear mapping, e.g., it can be a linear/nonlinear autoregressive exogenous (ARX/NARX) model. In this embodiment, we have chosen neural network as it is proven to be universal approximator (see, e.g., Hornik, Kurt, Maxwell Stinchcombe, and Halbert White. "Multilayer feedforward networks are universal approximators." Neural networks 2, no. 5 (1989): 359-366).

Figure 3:
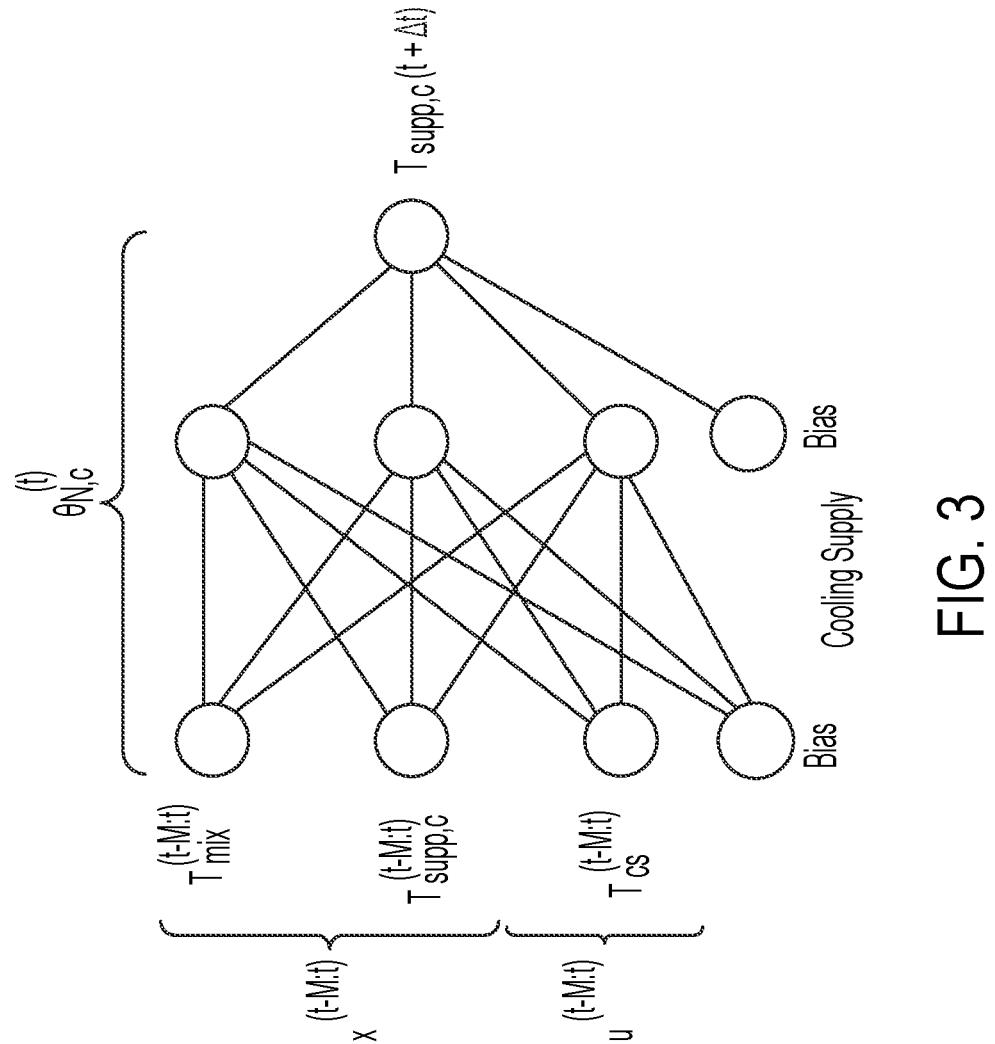
FIGS. 3 and 4 are diagrams of neural networks that may be used as a data driven model according to example embodiments.

Looking at FIG. 2, the supply air 204 with temperature $T_{supp,c}$ is distributed to all the zones, where it is reheated to $T_{supp,h,i}$ by a water-based heating coil associated with zone i. The aim of the data driven model is to have good predictive accuracy for $T_{supp,c}$, $T_{supp,h,i}$ for a control horizon of interest. The dynamics of cooling supply is modeled by the following feed forward neural network (NN) $f_{N,c}$ with parameters $\theta_N$:

$$T_{supp,c}(t+\Delta t)=f_{N,c}(x^{(t-M:t)},u^{(t-M:\,t)},\theta_{N,c}^{(t)}) \qquad (2)$$

where $T_{mix}$ is the mixed air temperature at the inlet of cooling system. In one or more embodiments, the NN uses tanh, ReLU, and softmax activation functions. An example of the cooling supply NN is shown in the diagram of FIG. 3. Assuming no heat loss or gain in the ducts, the mixed air temperature is calculated as:

$$T_{mix} = r_{mix}T_{amb} + (1 - r_{mix})T_{z,avg} \qquad (3a)$$

$$T_{z,avg} = \frac{1}{n}\sum_{i=1}^{n} T_{z,i} \qquad (3b)$$

from all the room exhausts $T_{z,avg}$ plus outside air given some mixing ratio $r_{mix}$.

Figure 4:
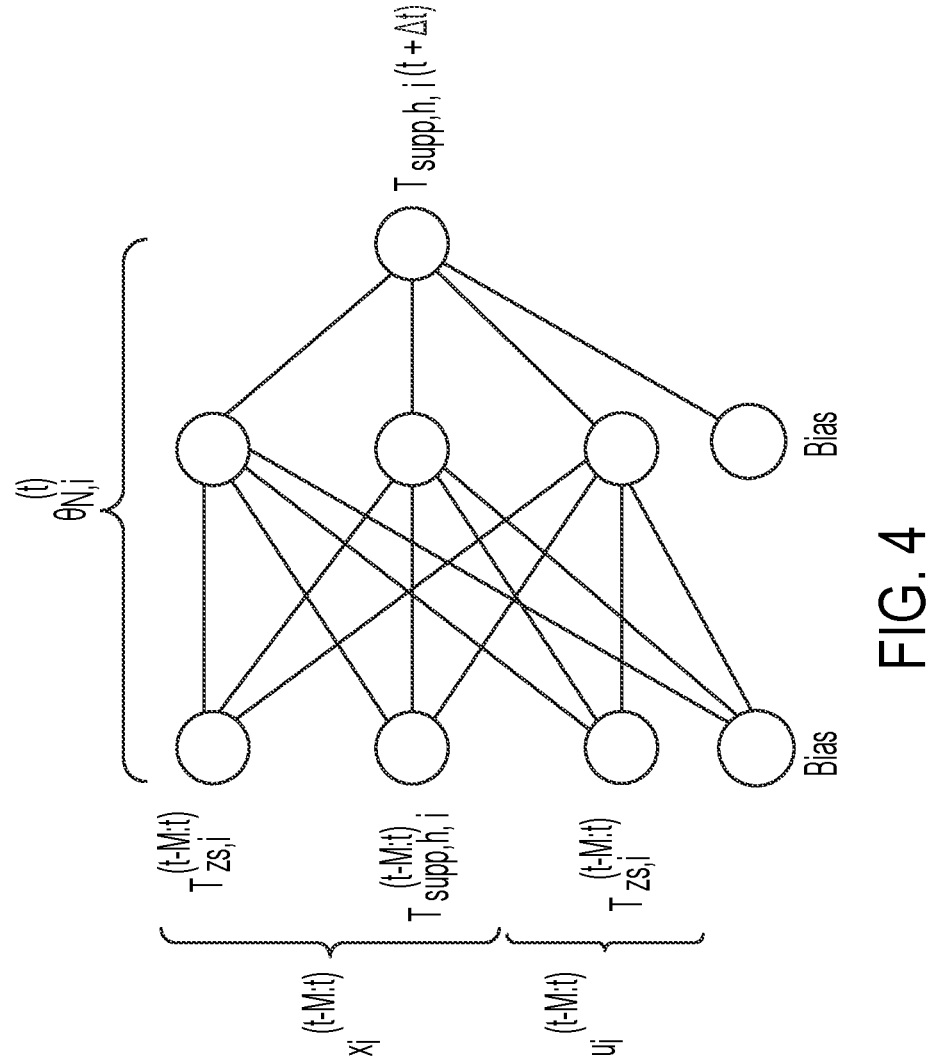

Notice that in (2) the superscripts indicate a time series, such that $(x^{(t-M:t)}, u^{(t-M:t)})$ represent the M lags of input and control prior to time t that are used for the prediction of the next state along with $\theta_{N,c}^{(t)}$, the NN parameter estimates at time t. This formulation is related to our choice of estimator, e.g., moving horizon estimator (MHE), for model identification. Similarly, for the VAV reheat box, the following NN can be used for $T_{supp,h,i}$ prediction:

$$T_{supp,hi}(T+\Delta t)=f_{N,i}(x_i^{(t-M:t)},u_i^{(t-M:t)},\theta_{N,i}^{(t)})$$

where $$\forall i\in\{1,2,3,\ldots,n\} \qquad (4)$$

where $T_{zs,i}$ represents individual zone set points and $f_{N,i}$ represents neural networks that learn the dynamics for VAV boxes. In FIG. 4, a diagram shows an example of a feedforward NN used for the $i^{th}$ VAV box. Similar to the cooling system, we use the M lags of control inputs and state in our model. For generalizability, it should be noted that it is a reasonable assumption to expect the availability of all these data points with a frequency of once per five minutes or better through the building management system.

III. Online Identification and Model Predictive Control

A prerequisite for MPC is to have available predictions of states and disturbances for the prediction horizon. To make such predictions, an accurate system model with suitable state estimator is desired. The model needs to be identified to measured data and be reasonably validated and adapted to ensure performance. For models discussed in previous section, we have assumed a lumped representation of the zones, which inherently loses accuracy over time, combined with a neural network, which is prone to over-fitting and will likely lose performance for out of training data. For more accurate predictions, we propose to compute them online in each time increment by first estimating latest state and model parameters from the M past inputs and measurement and thus adapting the lower-order model to latest building operating regime maintaining accuracy for the horizon of interest. The state and parameter estimation are posed as a constrained optimization similar and solve via a moving horizon strategy described.

A. Online Model Identification

We consider the following continuous time nonlinear system model that abstracts equations (1)-(4):

$$\dot{x}(t)=f(x(t),u(t);p(t),p_{tv}(t))+w(t) \qquad (5a)$$

$$x(t_0)=x_0$$

$$y(t)=h(x(t),u(t),p(t),p_{tv}(t))+v(t)$$

s.t.

$$T_{supp,c}^{\,l}\leq T_{supp,c}\leq T_{supp,c}^{\,u} \qquad (5b)$$

$$T_{supp,h,i}^{\,l}\leq T_{supp,hi}\leq T_{supp,c} \qquad (5c)$$

$$T_{heat,i}(t)\leq T_{z,i}(t)\leq T_{cool,i}(t) \qquad (5d)$$

$$T_{supp,c}\leq T_{mix} \qquad (5e)$$

$$T_{supp,c}\leq T_{supp,h,i} \qquad (5f)$$

Here, $p_{tv}$ are exogenous disturbances $\{\eta_{sol}, T_{amb}, \dot{Q}_{sol}\}$, $p_t$ are model parameters $\{\theta N, i, \theta N, \theta RC\}$ to be learned from data, and system states x and manipulated variables u are concatenation of (1-4) as described in the previous section. $w(t)$, $v(t)$ represent unmodeled system disturbances and measurement noise assumed to be zero mean, Gaussian, white and stationary. Constraints are interpreted as follows: a desired cooling supply air and desired VAV reheat supply air temperature range (5b-5c), desired comfort range for individual zones (5d) and strict cooling and heating for the cooling and heating units respectively (5e-5f).

We adopt a moving horizon strategy similar to one described in P. Kuhl, M. Diehl, T. Kraus, J. P. Schloder, and H. G. Bock, "A real-time algorithm for moving horizon state and parameter estimation," *Computers & chemical engineering*, vol. 35, no. 1, pp. 71-83, 2011. The algorithm is a recursive estimation technique where for a finite length sliding window of size M+1 the estimates $\hat{x}_{(t-M)}, \ldots \hat{x}_{(t)}, \hat{p}_{(t)}$ are obtained from previous measurements and control inputs $y_{(t-M)}, \ldots y_{(t)}, u_{(t-M)}, \ldots, u_{(t)}$.

Considering that, we now discuss the joint state and parameter estimation formulation. At time k, given the past state estimates $x_o^k=[\hat{x}^{(k-M-1)^T}, \ldots, \hat{x}^{(k-1)^T}]^T$, the parameter estimate $\hat{p}^{k-1}$, measurements $\{y(k+l)\}_{l=0}^{-M}$ and control inputs $\{u(k+l)\}_{l=0}^{-M}$, the MHE solves for $\{x^{*k-M}, x^{*k}, p^{*k}\}:=$ $$\arg\min_{\{\tilde{x}_0,\tilde{x}^k,\tilde{p}^k\}} \left\|\tilde{x}_0 - \hat{x}^{(k-M-1)}\right\|_{P_v}^2 + \left\|\tilde{p}^k - \hat{p}^{k-1}\right\|_{P_p}^2 + \qquad (6)$$

$$\sum_{t=k-M-1}^{k}\left[\left\|y(t) - h(\tilde{x}^k, u(t), \tilde{p}^k, p_{tv}(t))\right\|_{P_v}^2 + \|w(t)\|_{P_w}^w\right]$$

$$\text{s.t. } \hat{X} = \{\tilde{x}_0, \tilde{x}^k \in \mathbb{R}^M, \tilde{p}^k\} \in \Omega,$$

where, $\|1\|_M^2:=1^T M 1$ is the weighted vector norm, $P_x$, $P_p$, $P_v$, $P_w$, are symmetric, positive semi-definite matrices with appropriate dimensions. In particular, $P_v$ and $P_w$ are inverse of covariance matrices for measurement and process noise and penalize the state and measurement discrepancies. The optimal solution (6) provides the state and parameter estimate for time k as follows: $[\hat{x}^{(k-M)^T}, \ldots, \hat{x}^{(k)^T}]^T = [x_0^{(k-M)^T}, x*^k]$ and $\hat{p}^k = p*^k$. Generally, this is formulated as a Nonlinear Program (NLP), computing the first and second order derivatives with Automatic Differentiation (AD) and passing them to a solver (IPOPT, Gurobu etc.).

The feasible set $\Omega$ imposes the system dynamics and physics constraints in (5), e.g., limiting temperatures of various locations in the building to predefined ranges, occupant comfort restraints, etc. The parameter set p includes all model parameters for neural networks and RC models of equations (1), (2) and (4), including, $\{\theta_{N,i}, \theta_N, \theta_{RC}\}$. The moving horizon approach curtails the curse of dimensionality by reducing the degrees of freedom in the constrained least-square optimization in (6) (as opposed to full-information estimator). In (6), we consider states and model parameters as free parameters. This estimation results in time-varying model parameters for which, we regularize the parameter noise with $P_p$. For more details about MHE the readers are referred to P. Kuhl, M. Diehl, T. Kraus, J. P. Schloder, and H. G. Bock, "A real-time algorithm for moving horizon state and parameter estimation," *Computers & chemical engineering*, vol. 35, no. 1, pp. 71-83, 2011. The proposed MHE algorithm is computed as shown in Listing 1 below

---

Listing 1

1) Tune weight matrices $P_x$, $P_p$, $P_v$ and $P_w$ on historical data.
2)   Given the $x_o^k = [\hat{x}^{(k-M-1)^T}, \ldots, \hat{x}^{(k-1)^T}]^T$, the parameter estimate $\hat{p}^{k-1}$, measurements $\{y(k+1)\}_{l=0}^{-M}$ and inputs $\{u(k+1)\}_{l=0}^{-M}$, MHE solves for $\{x*^{k-M}, x*^k, p*^k\}$ using (6)
3)   $[\hat{x}^{(k-M-1)^T}, \ldots, \hat{x}^{(k-1)^T}]^T = x_o^{k+1} = [x_{0,*}^{(k-M)^T}, x*^k]$ and $\hat{p}^k = p*^k$.
4)   k = k + 1 and repeat steps 2) and 3)

---

We provide an empirical analysis of identification using the proposed algorithm for building models in the results section.

B. MPC Formulation

MPC is traditionally used for setpoint tracking by minimizing deviations. In this work, we are interested in keeping the temperatures of interest within certain desired bounds (operation bounds and adhering to occupant comfort constraints), while minimizing the cost of doing so. To achieve this, we formulate MPC as a supervisory controller for lower level control systems in the central cooling and heating units where at each time step, MPC generates tracking setpoints for lower level controllers. This formulation is particularly appealing for retrofitting legacy fine-tuned control systems that are already in operation in commercial buildings. More details are provided in the result section. Next, we define the cost, e.g., HVAC power consumption, and constraints associated with the formulation of energy optimization problem.

For the purposes of this example, the energy consumers in HVAC thermal cooling and heating costs in the building are: (i) central cooling unit of HVAC system, (ii) individual VAV reheat boxes of the zones and (iii) supply fan. We considered the energy consumption of cooling (heating) units to be a function of cooling (heating) load of the air. Suppose $P_c$, $P_h$ are the cooling coil power and the heating coil power, respectively. Then, at time k:

$$P_c^k = \frac{1}{\eta_c}\left(\sum_i m_i\right)c_{pw}\left[T_{mix}^k - T_{supp,c}^k\right] \tag{7a}$$

$$P_h^k = \frac{1}{\eta_h}\sum_i m_{z,i}c_{pa}\left[T_{supp,h,i}^k - T_{supp,c}^k\right] \tag{7b}$$

From (5f) and (5g), it follows that $P_{ck}$ and $P_{hk}$ are non-negative. The mass flow rates of the air ($m_i$, $m_{z,i}$) in the air loop is kept constant and hence the supply fan power is not considered in the MPC objective.

Measurements (y): We assume the following states as measured: $\{T_{supp,c}, T_{supp,h,i}, T_{z,i}\forall i\}$. In addition, we assume the following forecast for disturbances for the duration of the prediction horizon: $\{\eta_{sol}, T_{amb}, \dot{Q}_{occ}\}$ via online weather services and occupancy sensors.

Time varying constraints ($p_{tv}$): The constraints are provided by the system dynamics as shown in (5a-5f). Specifically, constraint (5d) satisfies occupant comfort in zone i, such that the occupant is considered to be comfortable when $T_{z,i}(t) \in [T_{heat,i}(t), T_{cool,i}(t)]$ at any time t.

MPC Objective: As is the case in traditional MPC, we implement the control algorithm in a receding horizon manner where an optimization over N time steps is solved at each step k with state $\hat{x}(k)$, control inputs $u(k)$ as:

$$\{\tilde{u}_*^{k+l}\}_{l=1}^N = \arg\min_{\{\tilde{u}^{k+1}\}_{l=1}^N} \sum_{l=k+1}^{k+N}\left[P_c^l + P_h^l + L_k^l\right] \tag{8}$$

$$\text{s.t. } \left(\{\tilde{u}^{k+1}\}_{l=1}^N, \{\hat{x}^{k+1}\}_{l=1}^N\right) \in \Omega$$

where the feasible set $\Omega$ imposes the system dynamics and constraints defined in (5), and $L_k^i = \Sigma_l\|\tilde{u}^{k+l} - \tilde{u}^{k+l-1}\|_R^2$ is a regularizer term, which penalizes large changes in the control inputs to avoid undesirable oscillations. Here, $\tilde{u}^k = u(k)$ and the regularization parameter R is tuned to obtain the desired smoothness in the control input trajectory $\{\tilde{u}^k\}$. For the duration of control, the MPC algorithm is computed as shown in Listing 2.

---

Listing 2

1)   Given the state $x^k$ at time k, MPC solves for the optimal $\{u^{k+l}\}_{l=1}^N$ such that (7) is minimized subject to the aforementioned constraints.
2)   $u^{k+1}$ is utilized to obtain $x^{k+1}$ from (1a)
3)   k = k + 1 and repeat steps 1) and 2)

---

C. Adaptive MPC

Putting the two previous sections together, we now propose an algorithm for recursive identification of the proposed model for model predictive building control. The algorithm consists of iterative implementation of MHE and MPC. Algorithm 1 outlines the detailed steps of our method.

Algorithm 1 Algorithm for Online learning of hybrid model for MPC

Input: time k, $x_0^k = [\tilde{x}^{(k-M-1)T}, \ldots, \tilde{x}^{(k-1)T}]^T, \hat{p}^{k-1}, \{y(l)\}_{l-k-M}^k, \{u(l)\}_{l-k-M}^k$
Output: u(k + 1)
1:     for all time k do
2:         Using $x_0^k, \hat{p}^{k-1}, \{y(l)\}_{l-k-M}^k, \{u(l)\}_{l-k-M}^k$, solve (6) to obtain $x_0^{k+1}$ and $\hat{p}^k$
3:         Set $\hat{x}(k) = x_0^{k+1}$ [M], $p(k) = \hat{p}^k$
4:         $\tilde{u}^k = u(k)$
5:         Solve (8) to obtain $\{\tilde{u}_*^{k+l}\}_{l-1}^N$
6:         $u(k + 1) = \tilde{u}_*^{k+l}$
7:     end for

IV. Results and Discussion

We verify the performance and effectiveness of the proposed estimation and control methodologies in simulation. We consider a well-known five zone model, with central cooling and distributed heating as depicted in FIG. 2. Each of these components is controlled by fine-tuned PI controllers as is common practice in commercial buildings. The main PI controller constrains the central system to chill the supply air to a supply air setpoint. In addition, each individual VAV reheat box has its own PI control that reheats the supply air to meet the individual zone setpoints. We consider all heating and cooling systems to be water-based. For the central cooling, we consider a PI controlled water-based cooling coil system that manipulates the water flow rate m w in order to track a desired supply air temperature (cooling):

$$\dot{m}_{w,c}(t+\Delta t)=k_p(T_{supp,c}(t)-T_{cs}(t))+k_i\int_{l=0}^t(T_{supp,c}-T_{cs})dt \quad (9)$$

Figure 8A:
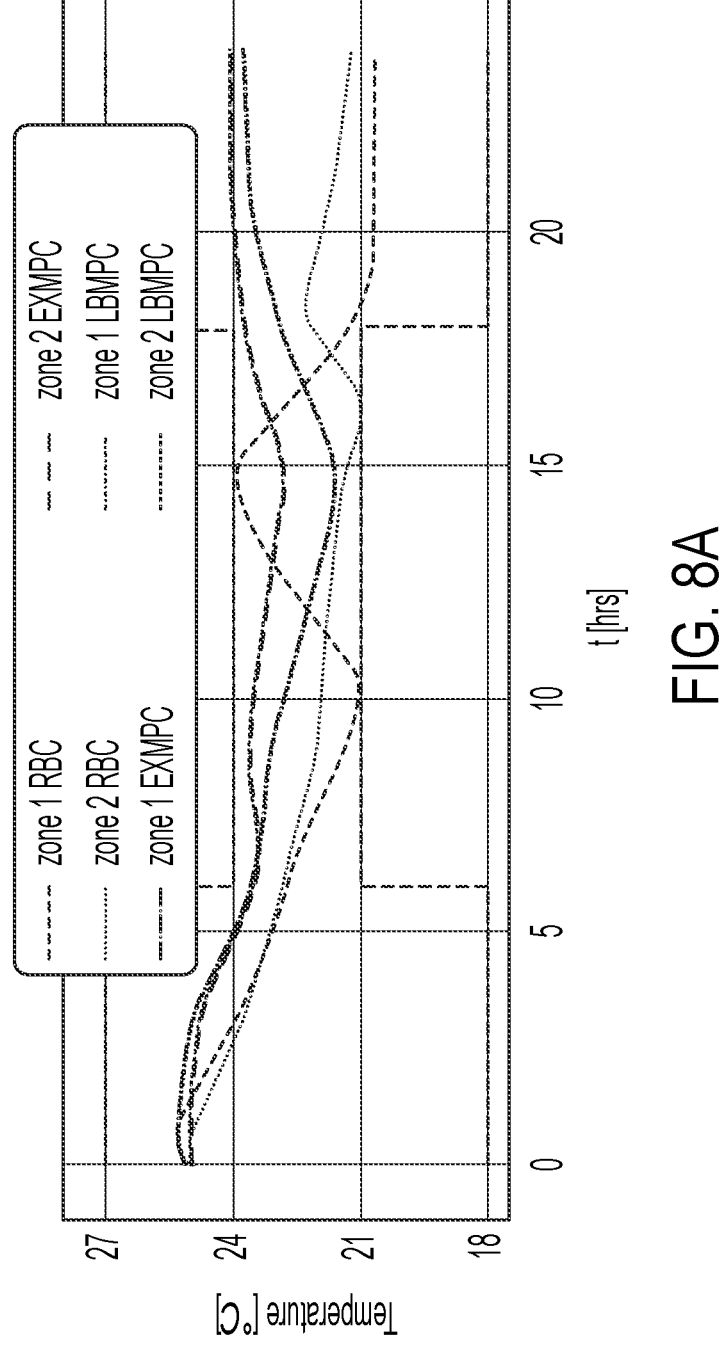
FIGS. 8A and 8B are graphs showing comparison of simulation results for various control methods.
Figure 8B:
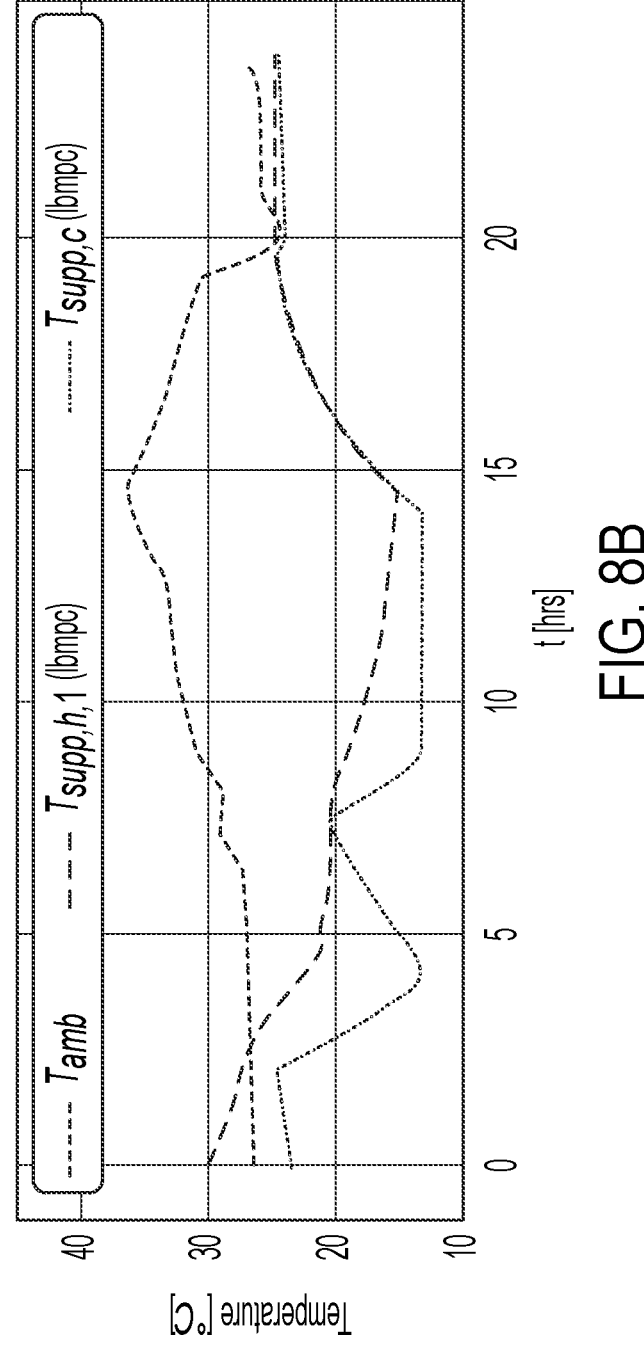
Figure 8C:
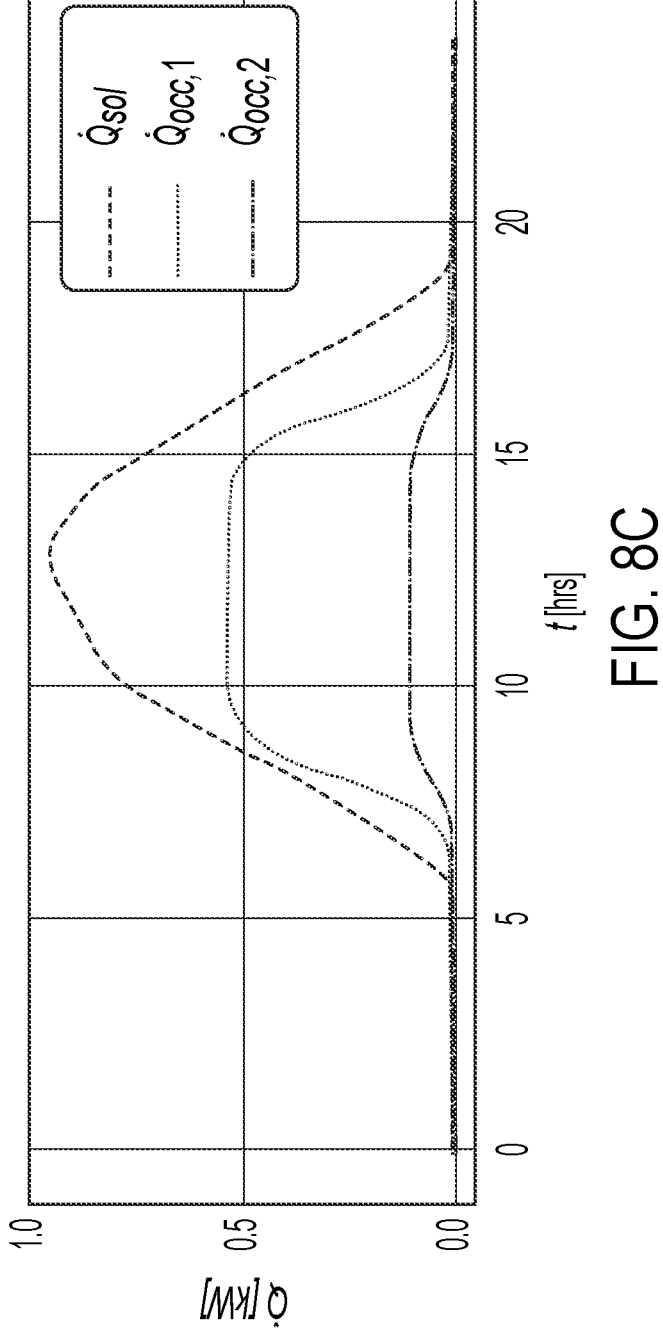
FIG. 8C is a diagram of solar and occupant heat loads used in system simulations.

The supply air with temperature $T_{supp,c}$ is distributed to all five zones, in each of which it is reheated to $T_{supp,h,i}$ by a water-based heating coil associated with zone i and controlled by a PI controller:

$$\dot{m}_{w,h,i}(t+\Delta t)=k_{p,i}(-T_{supp,h,i}(t)+T_{zs,i}(t))+k_{int,i}\int_{l=0}^t(-T_{supp,h,i}+T_{zs,i})dt \quad (10)$$

where $k_p$, $k_{p,i}$ and $k_i$, $k_{int,i}$ are PI controller gains for central cooling and reheat boxes, respectively. The ground truth zone models are adopted from D. Blum, F. Jorissen, S. Huang, Y. Chen, J. Arroyo, K. Benne, Y. Li, V. Gavan, L. Rivalin, L. Helsen, et al., *Prototyping the BOPTEST framework for simulation-based testing of advanced control strategies in buildings,* 2019 and are simulated using IDA solver (A. C. Hindmarsh, P. N. Brown, K. E. Grant, S. L. Lee, R. Serban, D. E. Shumaker, and C. S. Woodward, "Sundials: Suite of nonlinear and differential/algebraic equation solvers," *ACM Transactions on Mathematical Software (TOMS),* vol. 31, no. 3, pp. 363-396, 2005). We use June Florida weather at once per five minutes frequency, alongside occupancy profiles that are shown in FIGS. 8A-C. The details of the simulation models can be found in Table I. It is important to note that our proposed algorithm is not limited to this specific type of system but can rather be scaled and adopted for other types of HVAC systems. We validate Algorithm 1 on the proposed simulated model. The main results are threefold: (1) demonstration of the estimation results for MHE; (2) demonstration of the predictive accuracy of identified model; and (3) a comparative analysis between our proposed HVAC control, which we refer to as learning-based MPC (LBMPC), and the following controllers:

RBC: The rule-based controller is similar to simple deadband control and obeys the following rules: (a) The cooling unit PI tracks a desired supply air temperature setpoint. (b) The PI control of the heating units is activated every time the heating setpoint (lower band) is violated. (c) The zone PI controller remains engaged until the zone temperature reaches the cooling (upper band) setpoint at which point it disengages until the next violation. During unoccupied hours, the deadband between cooling and heating setpoints is widened and the cooling supply temperature setpoint is increased. These relaxed constraints, often referred to as "setback" which reduces the energy consumption during these unoccupied hours.

EXMPC: The MPC formulation in (8) assumes the exact, noise free dynamics of the building zone and HVAC system, hence all the state measurements are known. In this case, MPC provides near optimal solutions for this control problem for long predictive horizons. Both EXMPC and LBMPC are supervisory controllers that manipulate lower level controllers via cooling $T_{cs}$ and heating setpoints $T_{zs,i}$ with the goal of consuming minimal energy while keeping within zone setpoints. Before getting into detailed discussions, it is worth mentioning that to solve the dynamical system in (5a-5f) for the moving horizon estimation in (6) and the MPC in (8), a direct collocation with $4_{th}$ order polynomials with Radue collocation points in CasADi are exploited. For more information about CasADi, see J. A. Andersson, J. Gillis, G. Horn, J. B. Rawlings, and M. Diehl, "Casadi: a software framework for nonlinear optimization and optimal control," Mathematical Programming Computation, vol. 11, no. 1, pp. 1-36, 2019.

Both the estimation and control problems are solved using gradients and Hessian approximates of automatic differentiation (AD) in CasADi in conjunction with IPOPT (see. e.g., A. Wachter and L. T. Biegler, "On the implementation of an interior-point filter line-search algorithm for large-scale nonlinear programming," *Mathematical programming,* vol. 106, no. 1, pp. 25-57, 2006). These computational tools speed up the optimization and help achieve real time performance for adaptive model predictive building control.

Figure 5A:
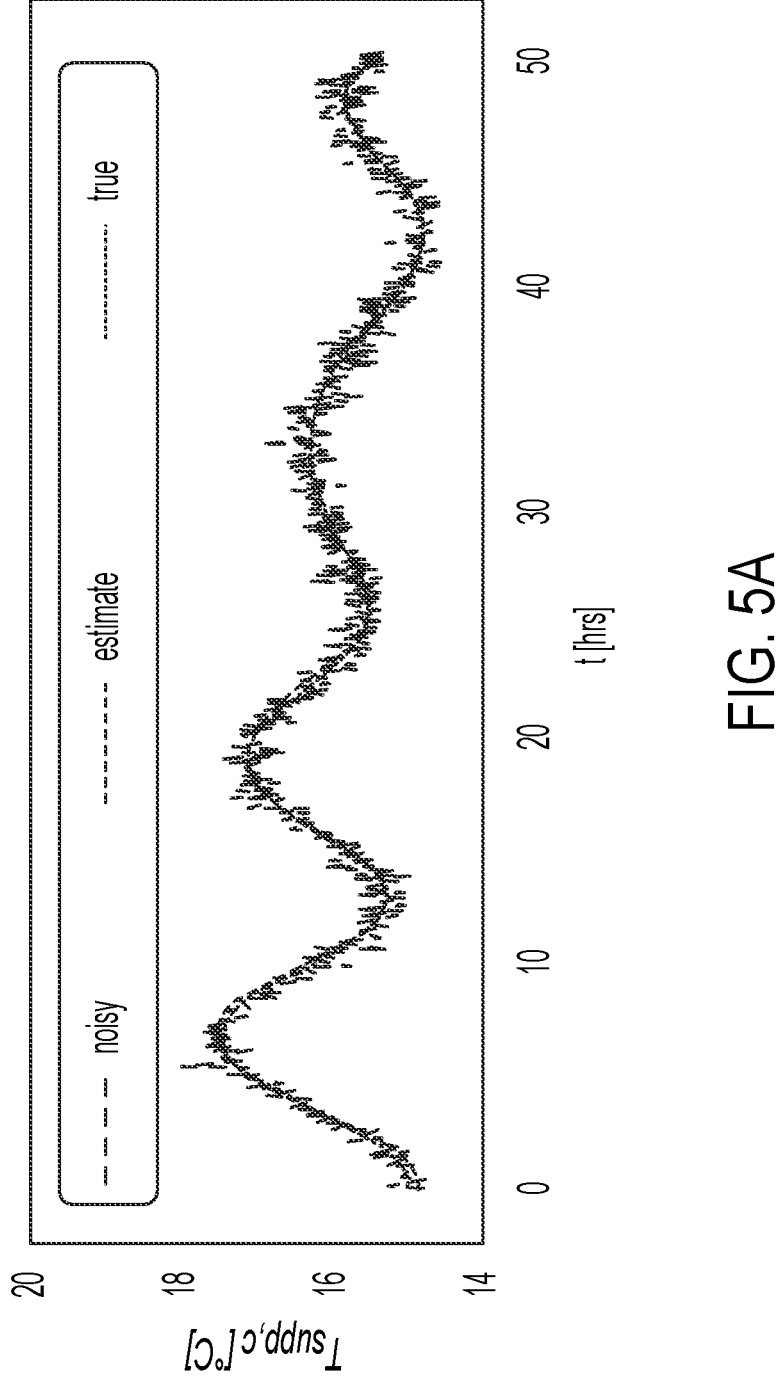
FIGS. 5A and 5B are graphs demonstrating the results of state estimation using a physics-constrained neural network model according to an example embodiment.
Figure 5B:
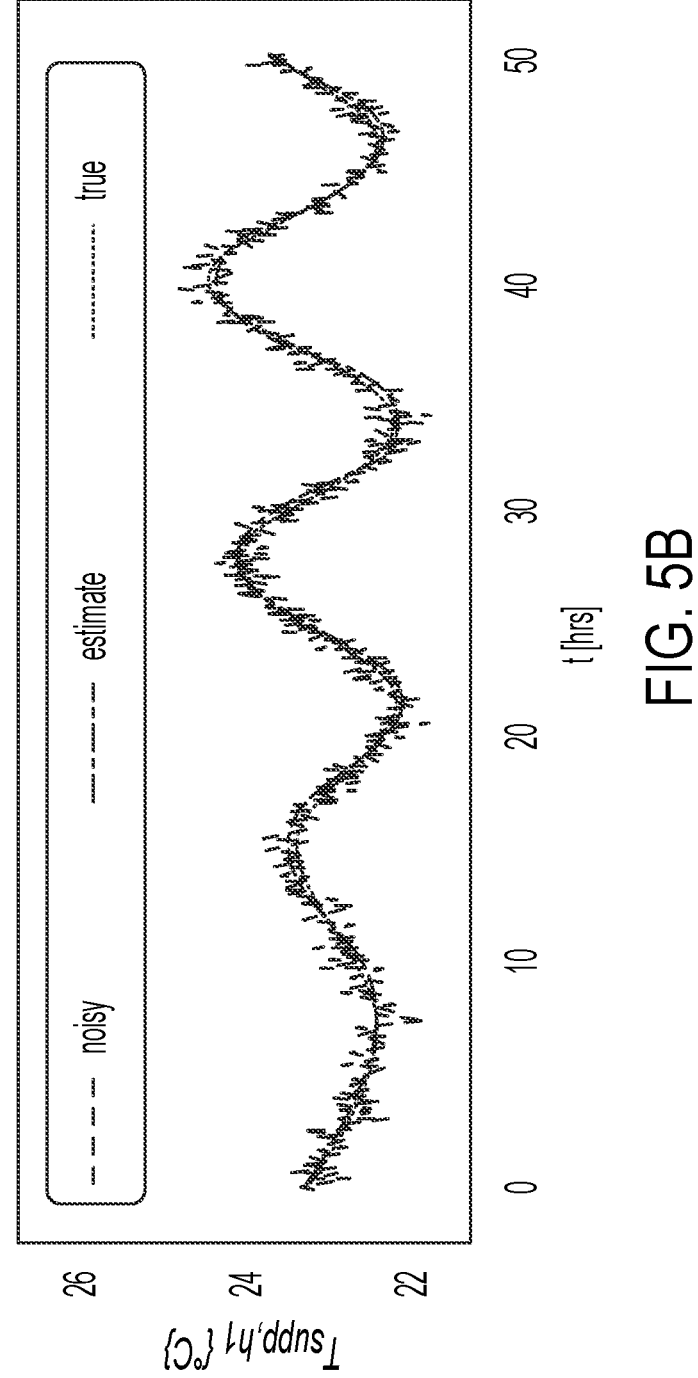

A. State Estimation and Learning Evaluation:

In total, we have 6 neural networks, one for cooling and five for heating units in (2) and (4). In all cases, we assume a single hidden layer with three hidden neurons, as shown in FIGS. 3 and 4. Since each network has three inputs and a single output, the total number of weights and biases amounts to 96 parameters (for each network, 9 weights and 3 biases for the input layer to hidden layer paths, plus 3 weights and 1 bias for the hidden layer to output layer paths). In addition, we also have 57 parameters in zone model from (1), for a total number of 153 parameters to be estimated. The graphs in FIGS. 5A and 5B demonstrate the results of state estimation. The graphs show the results of state estimation from noisy measurements of cooling supply air temperature $T_{supp,c}$ (FIG. 5A) and supply air temperature entering the main zone $T_{supp,h_1}$ (FIG. 5B) using the proposed neural networks in (2) and (4).

To generate ground truth, multisine reference signals are passed to respective PI controllers in (9,10) in the closed loop simulation. In addition, measurements noise $v_k \sim N_{iid}(0, 0.2)$ is added to all temperatures. Two things should be noted here: (1) these plots show estimation post convergence. Empirical evidence suggests that with proper tuning of matrices in (6), convergence can be achieved in less than 1000 iterations; (2) since the proposed estimation algorithm is recursive, model parameters are updated, and varying, at every iteration. This can raise questions regarding potential overfitting. To avoid overfitting, we tune $P_p$ to penalize parameter oscillation for a smooth adaptation. Furthermore, it should be noted that, unlike traditional gradient descent based learning, the learning process is abiding by the feasible set of dynamics and constraints in (5) and therefore, can be considered physics constrained.

Figure 6A:
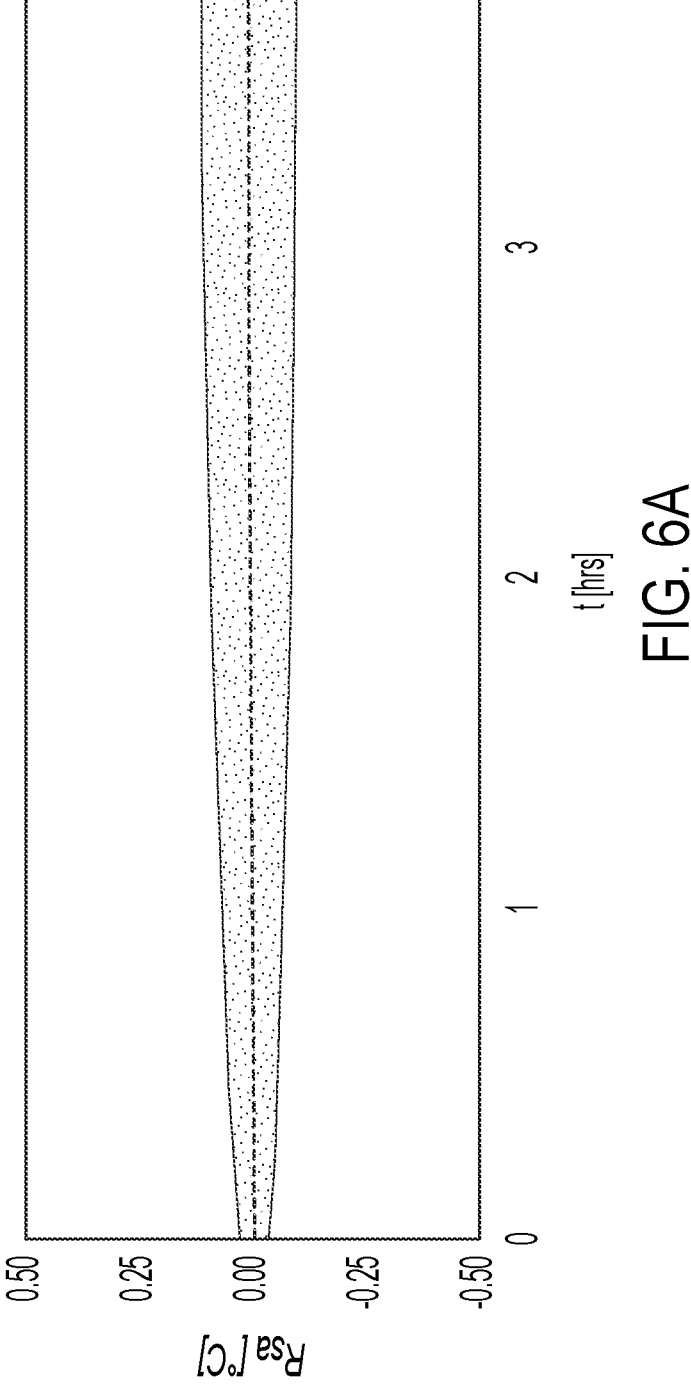
FIGS. 6A and 6B are graphs showing residuals for cooling and heating supply air temperatures in a system according to an example embodiment.
Figure 6B:
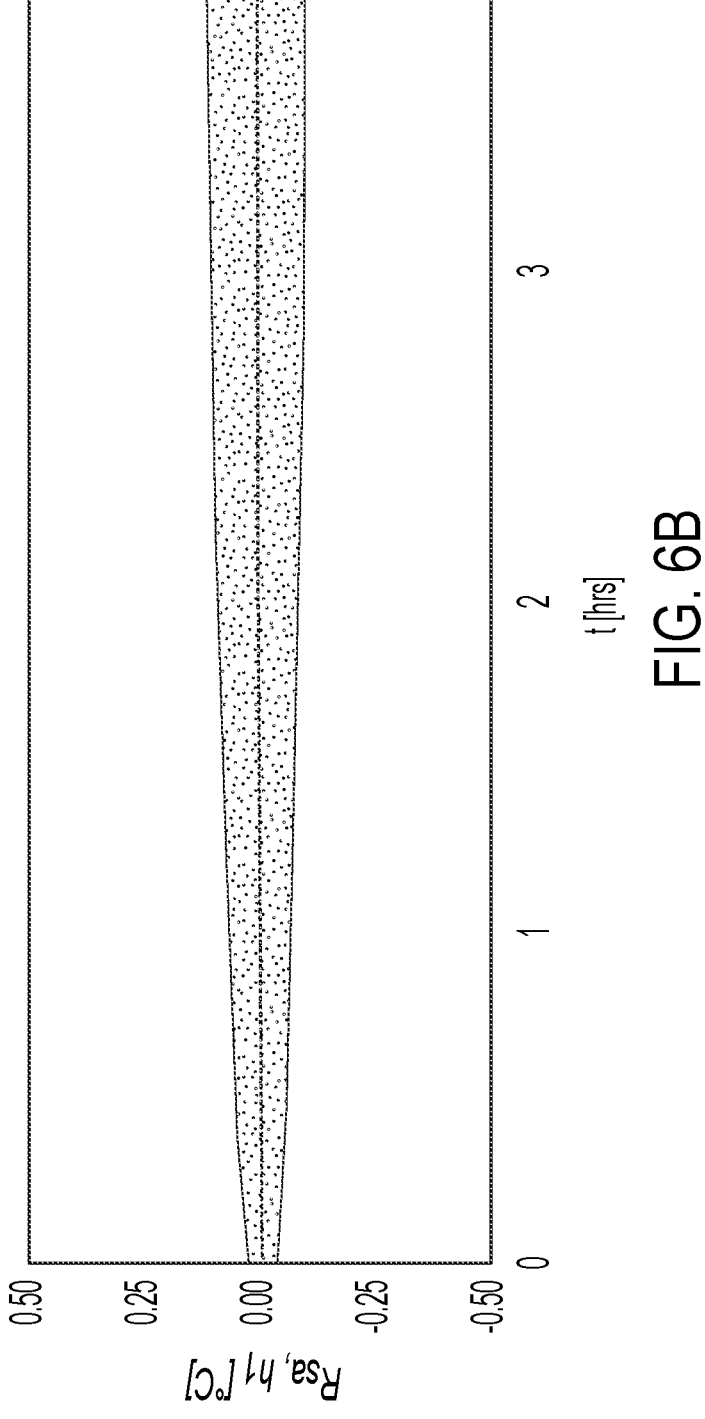

The graphs in FIGS. 6A and 6B are empirical evidence of the effectiveness of the predictive ability of our models for a horizon of four hours. Here, $R_{sa}$ are the residuals for cooling supply air temperature prediction (FIG. 6A) and $R_{sa,h1}$ represent residuals for heating supply air temperature of main one (FIG. 6B). The uncertainty in the plots comes from more than 3000 separate sets of predictions. The solid line are means and the shaded areas represent one standard deviation for the residual. Note that since the algorithm itself is recursive, the model is not trained on the future data points and these results should be treated similarly to out of training validation. Next we analyze the viability of the identification for MPC.

Figure 7A:
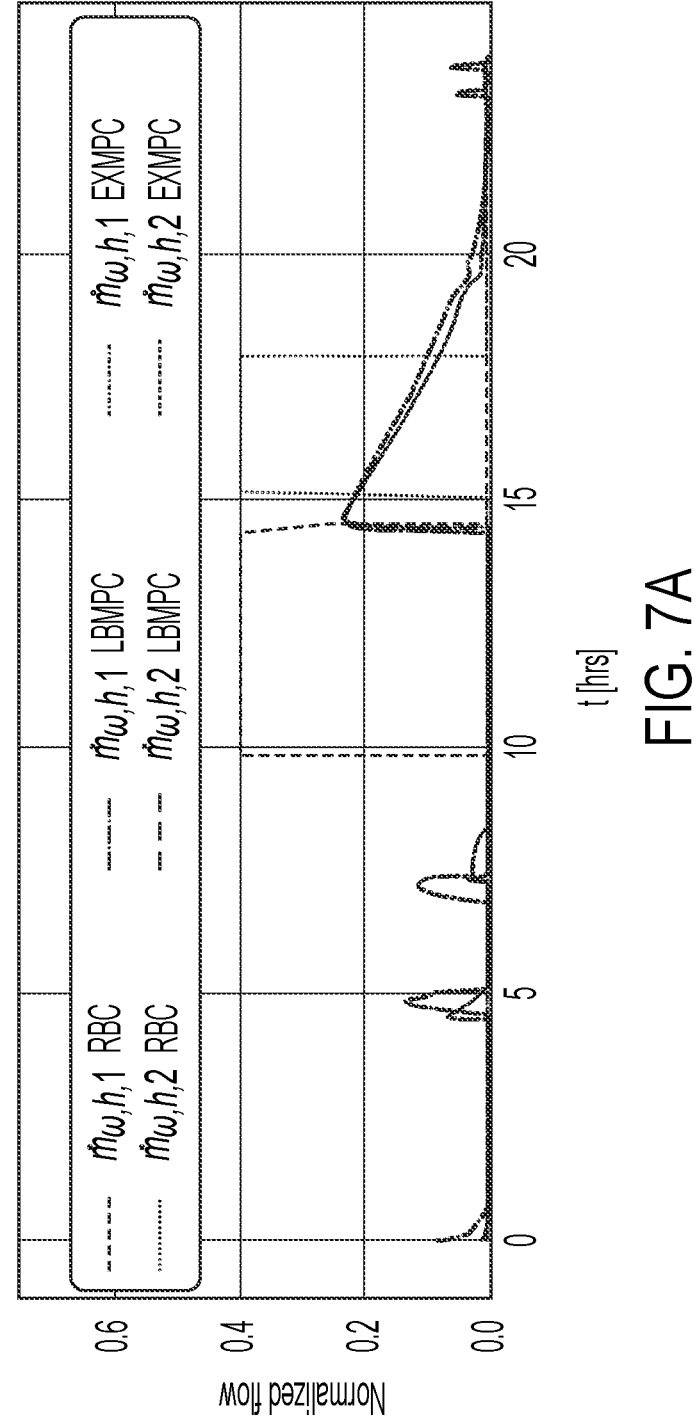
FIGS. 7A and 7B are graphs showing simulation results of a controller according to an example embodiment.
Figure 7B:
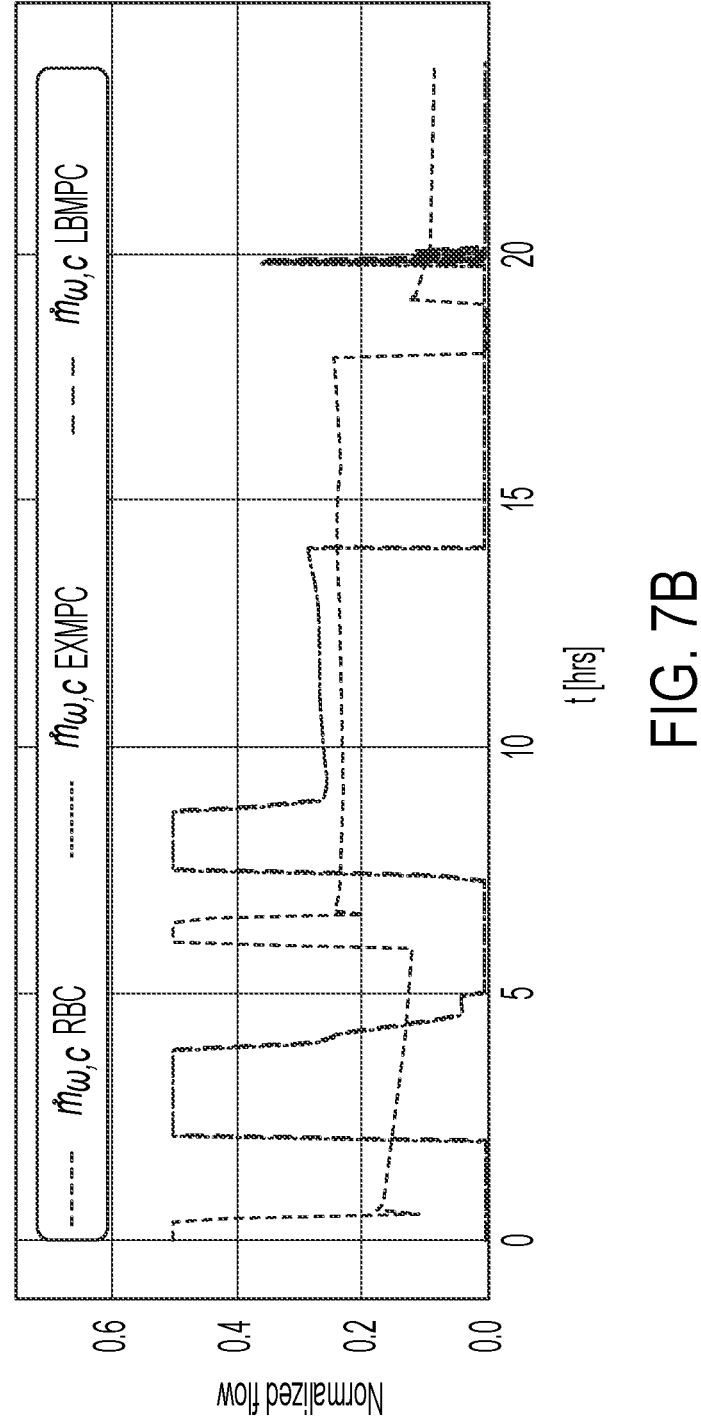

In FIGS. 7A and 7B, graphs show a comparison between RBC, LBMPC and EXMPC heating coil flow rate (FIG. 7A) and cooling coil flow rate (FIG. 7B) scaled down by their maximum flow rates $M_h$ and $M_c$. See FIG. 9 for the values. In FIGS. 8A-8C, graphs show comparisons between RBC, LBMPC and EXMPC zone temperatures (FIG. 8A), ambient air temperature, temperatures of the air at HVAC outlet and the VAV outlets (FIG. 8B) and solar and occupant loads (FIG. 8C). The detailed analysis of comparison is provided in the following section.

B. Control Results and Discussion:

RBC bounds are as follows: $T_{cs}$ is kept at 13° C. from 6 AM to 6 PM (occupied period) when it's generally assumed that the building is occupied, heating loads are peaking and conditioning is necessary. For the remaining hours, the supply cooling setpoint is relaxed to 18° C. It is evident that these numbers guarantee a sub optimal power consumption for the central cooling unit and there is potential for energy savings by relaxing this constrain and allowing the supply air temperature to float. On the heating side, the consequence of these low setpoints constitutes that the VAV box reheats the chilled air frequently to ensure the lower bound of performance in the zone is not violated (also changing with the same period as $T_{cs}$ as shown in FIGS. 8A and 8B). The prediction horizon for both MPC is 48 data points (4 hours). Looking at FIGS. 7A-7B and FIGS. 8A-8C, it is evident that LBMPC is matching the performance of EXMPC. This result is particularly encouraging since it has been achieved with no knowledge of the model and starting from random initialization of parameters until convergence is achieved. It is also somewhat expected from the identification results in FIGS. 6A and 6B. Below we discuss some of the interesting aspects of LBMPC performance:

6 AM-3 PM: Here LBMPC maintains the zone temperatures within the deadband as shown in FIG. 8A. Due to high ambient temperature and solar radiation, the perimeter zone (zone 2) cooling demand is increased to maintain performance. Hence the cooling coil is activated and the $T_{supp,c}$ falls close to 13° C. Since the cooling coil is shared among the zone, this results in a drop in the center zone (zone 1)

temperature down to 21° C. At around 3 PM, and with the sudden fall of solar and occupancy loads on the horizon, the cooling coil is disengaged and the heating coil is engaged in a preheating act to avoid a constraint violation for zone 1.

3 PM-2 AM: Towards the end of occupied period, and with the relaxation of the deadband, LBMPC increases the zones temperatures to reach the thermal equilibrium (thermalization) with the building, where the $T_{supp,c}$, $T_{supp,h,i}$ and $T_{mix}$ become closer to the ambient temperature. This follows from MPC objective in (7). From FIG. 8B, it is evident that thermalization is attained around 8 PM. Following that, and as a result of the decline in ambient temperature, MPC activates the cooling coil to maintain thermalization.

2 AM-6 AM: LBMPC has a look ahead prediction of 4 hours, and observes the constraint in advance, therefore it starts precooling the zones from 2 to 5 AM. In FIG. 7B, this high and hence the $T_{cs}$ drops significantly as shown in FIG. 8B.

Energy savings: As expected, and compared to RBC, LBMPC cuts the cooling and heating costs by a noticeable amount during this period of performance. The numbers are as follows: 9.33% reduction in heating coil energy, 23.2% in cooling coil energy, and overall there is an energy savings of 18.08% for the whole system. As explained before, most of the energy savings come from cutting overcooling and reheating compared to RBC cooling and heating units respectively. LBMPC performance is matched with EXMPC.

A few points should be noted here: in Identification, since we do random initialization of parameters, convergence will be achieved over several iterations and most likely during control operation in a real scenario (which can be assumed to deploy a rule-based control policy). In simulation (Monte Carlo convergence) we have observed that with the right choice of $P_p$, convergence happens in less than 1000 iterations (almost 3.5 days of training given 5 minute sampling time) for sufficiently exciting inputs such as chirp and multisine signals. To achieve reasonable performance in practice, there are two possible ways to curtail this problem: (1) using an offline training period (with historical data) and use the results as initialization for faster convergence and (2) Active learning during weekend periods towards leveraging sufficient excitation for fast convergence.

V. CONCLUSION

We have successfully demonstrated the modeling and use of nonlinear MHE for estimation and identification and MPC for building with unknown HVAC dynamics. We simultaneously learn the dynamics of the supply air temperatures for HVAC using a neural network and a lumped RC representation of zone level heat transfer. The online estimation and control algorithms have shown encouraging results for identifying a suitable model for MPC in one case study. We have also shown that the proposed algorithm is capable of performing energy saving tasks such as preheating and precooling.

By modeling in CasADi, we leverage algorithmic differentiation to speed up the nonlinear optimization by providing gradients to open source solvers, e.g. IPOPT.

Figure 10:
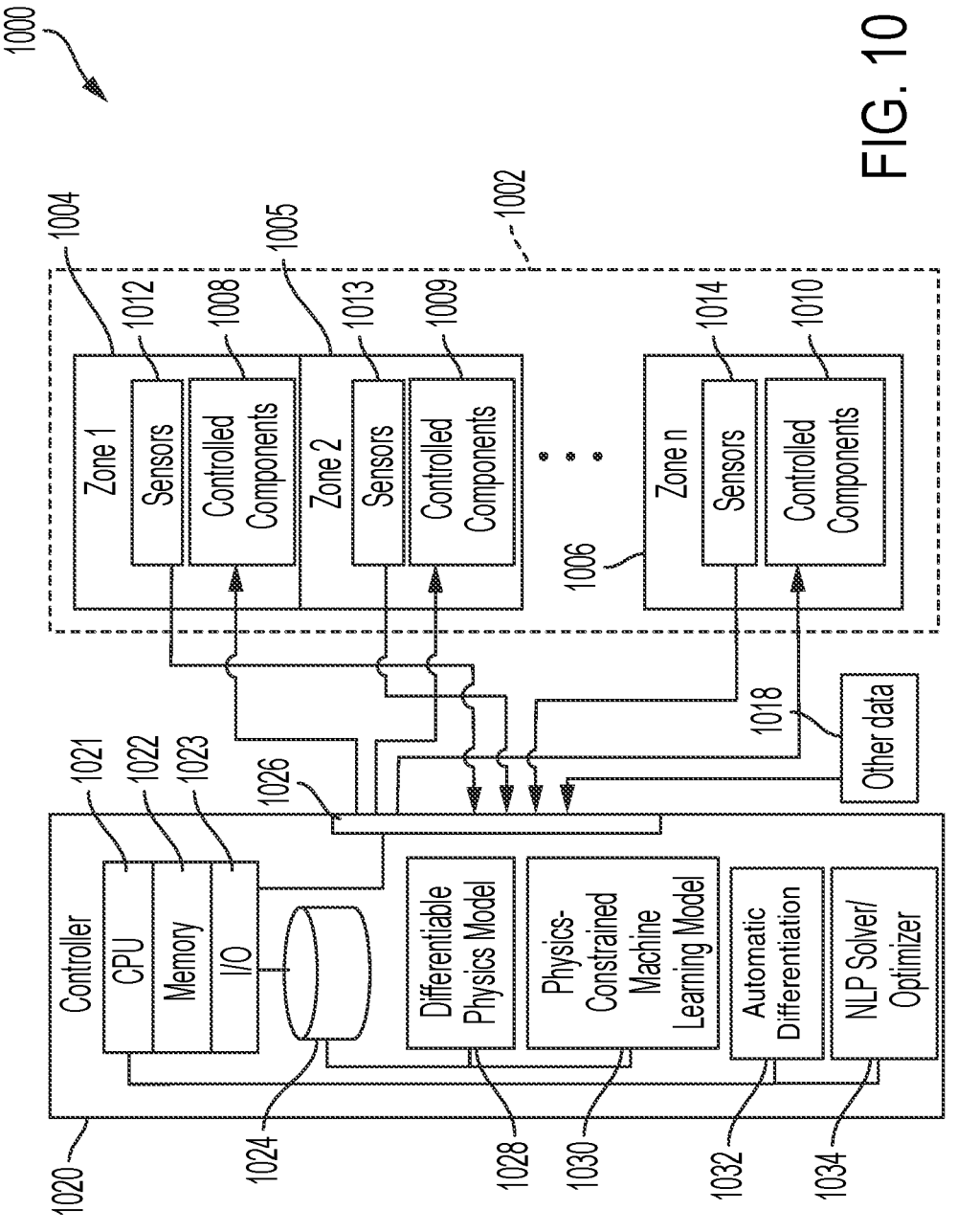
FIG. 10 is a block diagram of a system according to an example embodiment.

Note that the embodiments above can be implemented in a number of multi-zone HVAC systems that are centrally controlled. In FIG. 10, a block diagram illustrates a system 1000 according to an example embodiment. The system 1000 pertains to a building 1002 that is divided into a number of zones 1004-1006 that correspond to physical partitions of the building 1002 whose states (e.g., temperature, humidity)

are governed by thermodynamic relations between the zones 1004-1006 and throughout the building 1002 as a whole (e.g., solar irradiance on the building 1002). Note that, for purposes of the description of this system 1000, the zones 1004-1006 may include both separate partitions with individual controlled components/sensors and centralized controlled components/sensors that directly affect multiple zones. For example, the central cooler 202 and supply fan 206 shown in FIG. 2 may be considered part of Zone 0, the control of which affects all of Zones 1-5. Also note that the building 1002 may encompass multiple structures that use a common HVAC system.

The system 1000 uses conventional HVAC components (e.g., compressors, evaporators, chillers, heaters, VAV boxes, solar-thermal collectors, underground or underwater heat exchangers, fans, dehumidifiers, humidifiers, etc.) to affect the movement of heat through the building 1000, and any of those HVAC components that can be affected by an input signal are indicated as controlled components 1008-1010 which are each associated with one of the zones 1004-1006. Each of the zones 1004-1006 includes sensors 1012-1014 (e.g., temperature sensors, flow sensors, humidity sensors, solar radiation sensors, etc.) that gather state data that can be fed into a centralized controller 1020. Other sources of data 1018 may also be used as state inputs to the controller 1020, such as occupancy sensors, Internet-accessible weather data, etc. Generally, the inputs to the controlled components 1008-1010 affect the state variables measured by the sensors 1012-1014, and each controlled component 1008-1010 may primarily affect the zone in which the component is located, and secondarily affect other zones, e.g., via heat transfer through inter-zone boundaries.

The controller 1020 may include conventional computing hardware such as a central processing unit (CPU) 1021, memory 1022, input/output (I/O) interfaces 1023, and a non-volatile data storage unit 1024 (e.g., hard disk drives, solid state drives). The controller 1020 includes an external data interface 1026 that receives state information from the sensors 1012-1014 and sends inputs to controlled components 1008-1010. The data storage unit 1024 stores a differentiable physics model 1028 of the building that defines thermodynamic relationships between the zones of the building and the HVAC system. The differentiable physics model 1028 may be stored, for example, as a data file that is loaded into memory by a program and contains parameters that can be used to update the model 1028 as described herein.

The data storage unit 1024 also stores a physics-constrained, data driven model 1030 that estimates behavior of the controlled components 1008-1010. The machine-learning model 1030 may be stored together with the differentiable physics model 1028, e.g., executed by the same program, or may be stored separately and/or executed by a different program. The machine-learning model 1030 is a black box model that makes few if any assumptions about the controlled components 1008-1010, however its outputs can be constrained to ensure a feasible set of states that describe system dynamics and physics.

During operation of the system 1000, e.g., when the system 1000 is actively controlling the building HVAC, differentiable physics-based model 1028 and machine-learning model 1030 are used to determine control inputs to the controlled components 1008-1010, as well as having their parameters jointly updated at the same time based on a series of previous states and inputs. These control inputs and parameter updates may be calculated using any combination of automatic differentiation 1032 and a non-linear solver/optimizer 1034.

For example, the processor 1021 performs, for each of a series of times during online operation of the HVAC system, recording past state values representing a performance of the HVAC system in the building 1002 and past inputs to the HVAC system to maintain the states. The processor 1021 inputs the past state values and the past inputs into the differentiable physics model 1028 and the physics-constrained, data driven model 1030 to jointly update first parameters of the physics-constrained, data driven model and second parameters of the differentiable physics model. The inputting the past state values and the past inputs (plus a current state measurement) are used the determine a current input to the controlled components 1008-1010. The controller 1020 applies the current input to the controlled components 1008-1010, e.g., via external interface 1026.

The various embodiments described above may be implemented using circuitry, firmware, and/or software modules that interact to provide particular results. One of skill in the arts can readily implement such described functionality, either at a modular level or as a whole, using knowledge generally known in the art. For example, the diagrams and algorithms illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

The invention claimed is:
1. A method comprising:
determining a differentiable physics model of a building, the differentiable physics model defining thermodynamic relationships between zones of the building and a heating, ventilation, and air-conditioning (HVAC) system;
forming a physics-constrained, data driven model that learns behaviors of controlled components of the HVAC system;
for each of a series of times during online operation of the HVAC system, recording past state values representing a performance of the HVAC system in the building and recording past inputs to the HVAC system to maintain the states;

inputting the past state values and the past inputs into the differentiable physics model and the data driven model to: jointly update first parameters of the differentiable physics model and second parameters of the data driven model; and determine a current input to the controlled components; and applying the current input to the controlled components.

2. The method of claim 1, wherein the inputs to the controlled components are determined via a supervisory model predictive controller (MPC), wherein MPC controller determines setpoints for the controlled components to minimize an overall power consumption of the HVAC system while adhering to occupant comfort constraints.

3. The method of claim 2, wherein the differentiable physics model and the data driven model are continuously estimated before each MPC iteration.

4. The method of claim 1, wherein the first and second parameters are updated using moving horizon estimation.

5. The method of claim 1, wherein the controlled components comprise any combination of heating and cooling units.

6. The method of claim 5, wherein the cooling units comprise a central cooling system and the heating units comprise zone-specific variable air volume reheat boxes.

7. The method of claim 1, wherein the controlled components each comprises fine-tuned proportional integral (PI) controllers, the physics-constrained, data driven model modeling behaviors of the PI controllers.

8. The method of claim 1, wherein the data driven model is physics-constrained to limit temperatures of various locations in the building to predefined ranges.

9. The method of claim 1, wherein the data driven model includes a feedforward neural network.

10. The method of claim 9, wherein the feedforward neural network comprises a plurality of feedforward neural networks, each of the plurality of feedforward neural networks associated with one of the controlled components.

11. The method of claim 1, wherein jointly updating the first and second parameters comprises computing first and second order derivatives of the differentiable physics model and the data driven model with automatic differentiation, the first and second order derivatives being passed to a non-linear solver that updates the first and second parameters using a non-linear optimization.

12. A system comprising:

a plurality of sensors that collect state information from zones of a heating, ventilation, and air-conditioning (HVAC) of a building;

a plurality of controlled components of the HVAC system coupled to receive inputs that affect the state information; and a controller comprising a data interface that receives the state information and sends the inputs to controlled components of the HVAC system, the controller comprising a data storage unit that stores:

a differentiable physics model of the building that defines thermodynamic relationships between the zones of the building and the HVAC system, the differentiable physics model having first parameters that are updatable during operation of the HVAC system; and a physics-constrained, data driven model that learns behaviors of the controlled components, the data driven model having second parameters that are updatable during operation of the HVAC system;

the controller further comprising a processor coupled to the data interface and the data storage unit, the processor configured to perform:

for each of a series of times during online operation of the HVAC system, recording past state values representing a performance of the HVAC system in the building and recording past inputs to the HVAC system to maintain the states;

inputting the past state values and the past inputs into the differentiable physics model and the physics-constrained, data driven model to jointly update the first parameters and the second parameters and to determine a current input to the controlled components; and applying the current input to the controlled components.

13. The system of claim 12, wherein the inputs to the controlled components are determined via a supervisory model predictive controller (MPC), wherein MPC controller determines setpoints for the controlled components to minimize an overall power consumption of the HVAC system, and adhering to occupant comfort constraints.

14. The system of claim 12, wherein the first and second parameters are updated using a moving horizon estimate.

15. The system of claim 12, wherein the controlled components comprise a combination of a central cooling system and zone-specific variable air volume reheat boxes.

16. The system of claim 12, wherein the controlled components each comprises fine-tuned proportional integral (PI) controllers, the physics-constrained, data driven model modeling behaviors of the PI controllers.

17. The system of claim 12, wherein the data driven model includes a plurality of feedforward neural networks, each of the plurality of feedforward neural networks associated with one of the controlled components.

18. The system of claim 12, wherein jointly updating the first and second parameters comprises computing first and second order derivatives of the differentiable physics model and the data driven model with automatic differentiation, the first and second order derivatives being passed to a non-linear solver that updates the first and second parameters using a non-linear optimization.

* * * * *